(12) United States Patent
Dudman

(10) Patent No.: US 7,455,300 B2
(45) Date of Patent: Nov. 25, 2008

(54) GASKET RING WITH SHARP PEAKS

(76) Inventor: Richard L. Dudman, 1705 E. 238th St., Euclid, OH (US) 44117

( * ) Notice: Subject to any disclaimer, the term of this patent is extended or adjusted under 35 U.S.C. 154(b) by 0 days.

(21) Appl. No.: 11/295,234

(22) Filed: Dec. 6, 2005

(65) Prior Publication Data

US 2006/0145428 A1    Jul. 6, 2006

Related U.S. Application Data

(60) Provisional application No. 60/640,414, filed on Dec. 30, 2004.

(51) Int. Cl.
*F16L 17/00* (2006.01)
(52) U.S. Cl. .................................................... 277/626
(58) Field of Classification Search ................. 277/611, 277/612, 626, 644, 649, 627, 652, 654, 638
See application file for complete search history.

(56) References Cited

U.S. PATENT DOCUMENTS

| | | | |
|---|---|---|---|
| 222,388 A | | 12/1879 | Doty |
| 805,645 A | * | 11/1905 | Guillott ........................ 277/612 |
| 843,394 A | * | 2/1907 | Haynes ........................ 277/595 |
| 922,130 A | * | 5/1909 | Goetze ........................ 277/612 |
| 2,992,151 A | * | 7/1961 | Niessen ........................ 428/133 |
| 3,053,544 A | | 9/1962 | Gorsica |
| 4,203,608 A | | 5/1980 | Nicholson |
| 4,485,138 A | * | 11/1984 | Yamamoto et al. ........... 428/131 |
| 5,421,594 A | * | 6/1995 | Becerra ........................ 277/608 |
| 5,951,021 A | * | 9/1999 | Ueta ........................... 277/593 |
| 6,007,069 A | * | 12/1999 | Sadowski ..................... 277/374 |
| 6,092,811 A | * | 7/2000 | Bojarczuk et al. ............ 277/627 |
| 6,457,726 B1 | * | 10/2002 | Jung ........................... 277/611 |
| 6,607,830 B2 | * | 8/2003 | Murakami et al. ........... 428/422 |
| 6,845,983 B1 | * | 1/2005 | Suggs et al. ................. 277/314 |
| 2005/0280214 A1 | * | 12/2005 | Richards ..................... 277/608 |

FOREIGN PATENT DOCUMENTS

| | | |
|---|---|---|
| DE | 28 41 812 A1 | 4/1979 |
| DE | 36 33 335 A1 | 4/1988 |
| EP | 0 358 855 | 3/1990 |
| EP | 0 937 924 A2 | 8/1999 |

OTHER PUBLICATIONS

Translation of DE 36 33 335; Ridged Sealing Element for a Seal and Method for its Manufacture.
Translation of DE 28 41 812; Sealing Element.
European Search Report with Extended European Search Report of Application No. 05028672.3, date of mailing Feb. 24, 2006—7 pgs.

* cited by examiner

*Primary Examiner*—Patricia Engle
*Assistant Examiner*—Gilbert Y Lee
(74) *Attorney, Agent, or Firm*—Jones Day

(57) ABSTRACT

A seal has a core ring that is corrugated and a resilient material is attached to one or both of the top side surface and the bottom side surface. There is at least one corrugation on the top side (a convex corrugation) and at least one corrugation on the bottom side (a concave corrugation). The corrugations have sharp peaks and are shifted out of phase. A grommet around the inner diameter deters extrusion of the resilient material into the sealed system, and a folded over portion on the outer diameter helps deters extrusion into the environment.

29 Claims, 9 Drawing Sheets

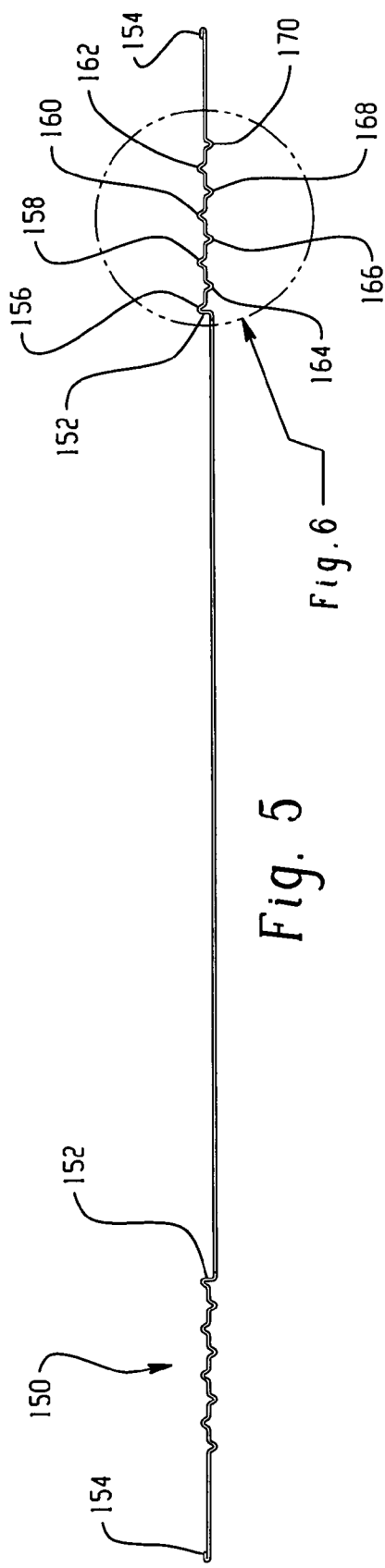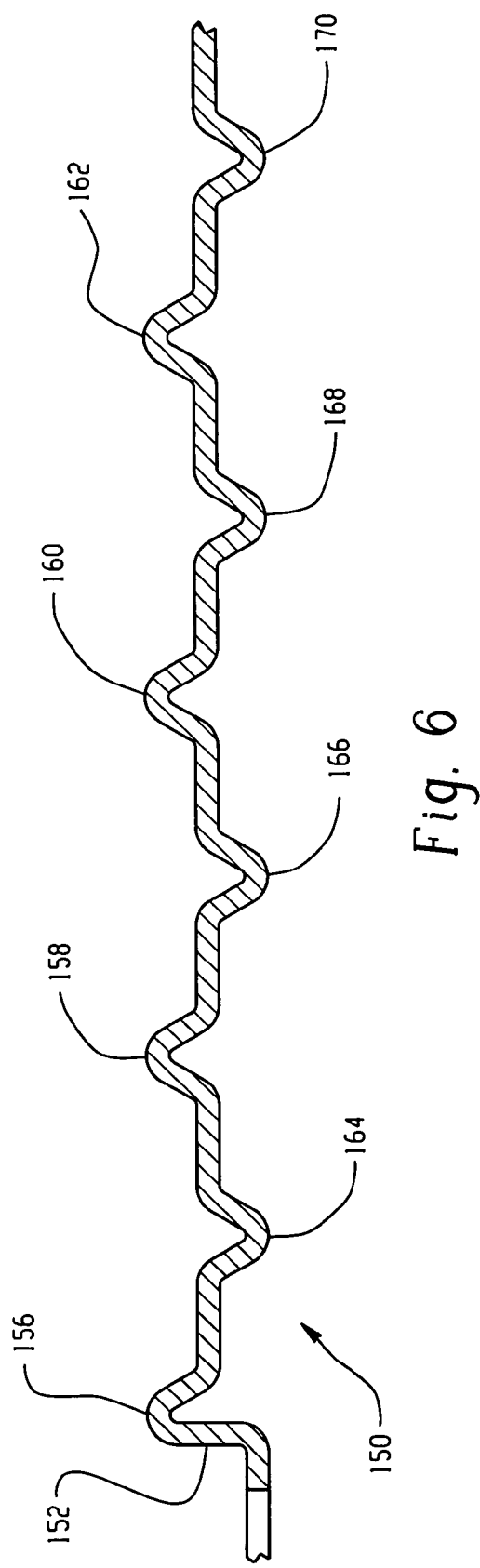

GASKET RING WITH SHARP PEAKS

CROSS-REFERENCE TO RELATED APPLICATION

This application claims the benefit of priority from U.S. Provisional Application No. 60/640,414, filed on Dec. 30, 2004. This prior application, including the entire written description and drawing figures, is hereby incorporated into the present application by reference.

FIELD

This technology relates to a gasket-type seal. In particular, the technology concerns a gasket-type static seal that may have a single layer or multiple layers of different materials and that is used for sealing a faying surface.

BACKGROUND

One type of static seal is a ring-shaped seal that is composed of at least two materials. The core part is a rigid material, and the other part (or parts) is another type of material. The rigid core material is typically a metal, and the second material is typically graphite. The second material is typically attached to both the top and bottom of the core material. Thus, in a typical seal of this type there is a flat, ring-shaped metal core sandwiched between two ring-shaped sheets of graphite.

This type of static seal can be used to seal any faying surface. For example, the seal may function to seal the end of pipeline connections; and bolts, screws, and various flange-type connections may also be sealed.

The seal is placed under an axial load when the two surfaces to be sealed are tightened close together. The second material may be a softer material that conforms to irregularities of the surfaces and enhances the sealing function. It may also be a harder material that enhances the durability of the seal. The metal core functions to give the seal a solid structure and provides resiliency to push against the faying surfaces. The metal core ring can also be used as a seal by itself, particularly in high temperature applications.

Current designs exhibit some problems when subjected to axial compression. As the axial load on the seal increases, the resilient material may have a tendency to be forced out radially from the sealing surface, and the typical core ring has a sinusoidal wave shape that flattens out. Accordingly, seals must intermittently be replaced or repaired because they inevitably wear away or are extruded from the sealing surface. This requires the mechanism on which the seal is acting to be shut down until the seal can be repaired or replaced. Consequently, this entails an expense in lost time while the machine is down, as well as labor and material costs.

When a seal breaks down it may also cause fugitive emissions. Depending on the application, this can cause serious health and environmental problems. With recently heightened EPA restrictions on emissions, the durability and longevity of a seal is extremely important.

BRIEF DESCRIPTION OF THE DRAWING FIGURES

FIG. 5 is a cross-sectional view of a third example core ring;

FIG. 6 is a partial cross-sectional view of the core ring shown in FIG. 5;

DETAILED DESCRIPTION

The seal described below is an inner core ring that has a particular shape that has sharp, non-sinusoidal corrugations that may be coupled to one or more rings of a resilient material. The core ring is designed to better deter a resilient material from extruding from the seal by retaining its peaked shape under stress. It is also designed to retain its peaked shape, instead of flattening out. This design makes the seal more durable and enhances the overall sealing effectiveness of the seal.

Figure 4:
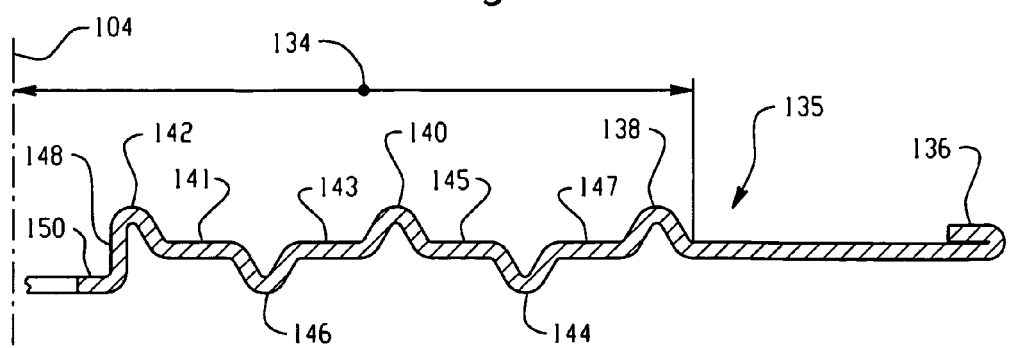
FIG. 4 is a partial cross-sectional view of the core ring shown in FIG. 2.

The core ring includes one or more corrugations. Preferably, at least one corrugation is formed on the top surface of the ring and at least one corrugation is formed on the bottom side of the ring. As shown in the examples of FIG. 4 and FIG. 5, four corrugations are formed on the top side and four corrugations are formed on the bottom side. The corrugations begin at the inner periphery of the core ring and continue toward the outer circumference.

Figure 1:
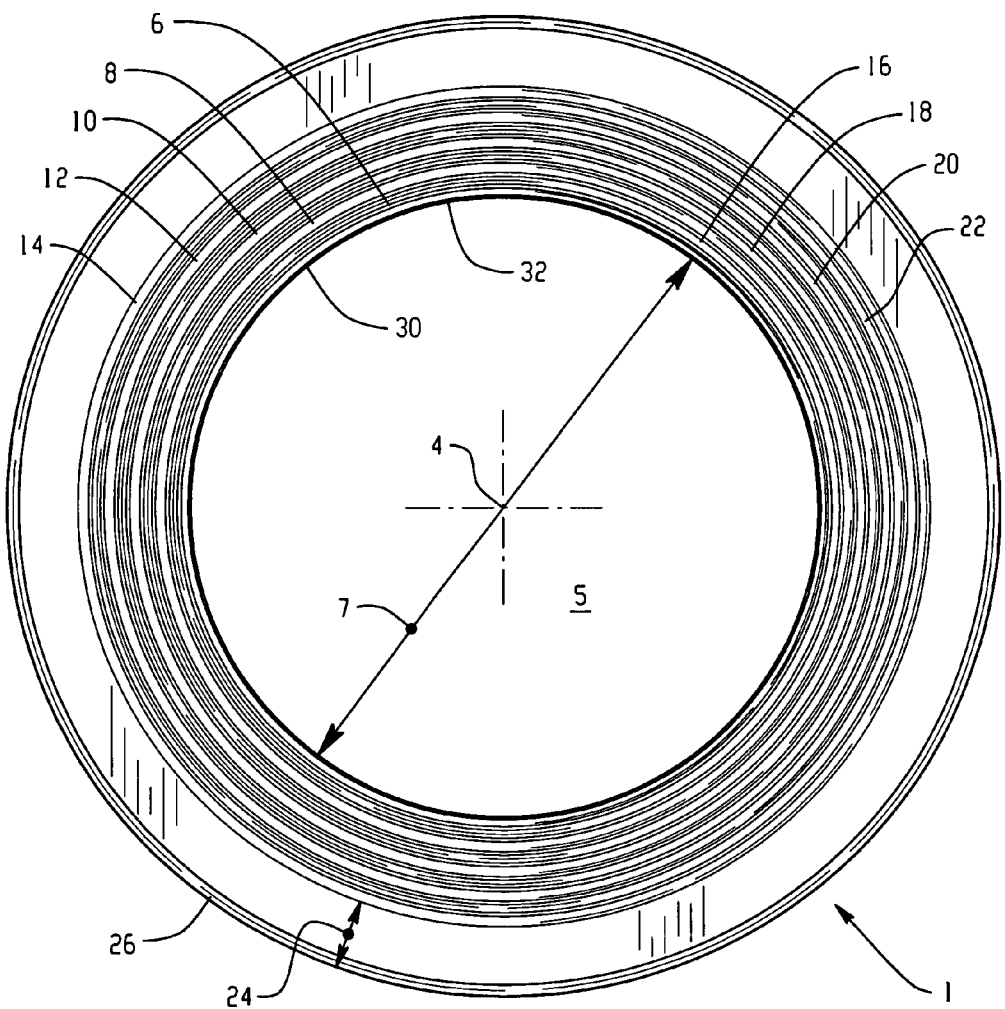
FIG. 1 is a top view of an example core ring.

With reference now to the drawings, FIG. 1 shows a top view of an example core ring 1. The ring 1 has a center opening 5 defined by the inner diameter 7 of the ring 1. An axis 4 runs through the center of the center opening 5 and is perpendicular to the radial plane of the ring 1. The example ring 1 may be a #150 ANSI class made of 300 series stainless steel. Other rigid materials may also be used to make the example core ring 1, including, but not limited to: brass, gold, inconel, plastic, or ceramics.

The example ring 1 of FIG. 1 has five convex corrugations 6, 8, 10, 12, 14, and four concave corrugations 16, 18, 20, 22. In other examples, only one corrugation on top and one corrugation on the bottom is utilized, although any number greater than this could be used. The corrugations begin near the inner periphery of the core ring 1 and continue toward the outer circumference.

A corrugation is a depression or bump in an otherwise straight sloped plane that has a thickness that remains relatively constant. A convex corrugation is one that is raised toward the top of the axis 4, and a concave corrugation is one that is depressed toward the bottom of the axis 4. A corrugation has two inclined sides 9, 11 and a peak 10a. (The reference numbers 9, 10a, and 11 are provided as examples on one convex corrugation 10 on FIG. 1a.) On the radially inner 9 side of a convex corrugation, the surface rises toward the high peak 10a as the distance from the axis 4 increases. On the radially outer side 11 of a convex corrugation, the surface falls away from the peak 10a as the distance from the axis 4 increases. Accordingly, on the radially inner side 17 of a concave corrugation, the surface falls toward the low peak 18a as the distance from the axis 4 increases. On the radially outer side 19 of a convex corrugation, the surface rises away from the peak as the distance from the axis 4 increases. (The reference numbers 17, 18a, and 19 are provided as examples on one concave corrugation 18 on FIG. 1a.)

The corrugations are concentric in shape, meaning each of the corrugations are disposed around the example ring 1 in a substantially circular manner and have a common center 4. Each corrugation has a successively larger diameter as they approach the outer diameter of the ring 1.

The corrugations are connected to each other and shifted out of phase by a linking portion 21 that is less severely curved than the corrugation. (The reference number 21 is provided as an example between two corrugations 12, 20 on FIG. 1a.) In other examples, the linking portion may be flat in the radial plane.

Figure 8:
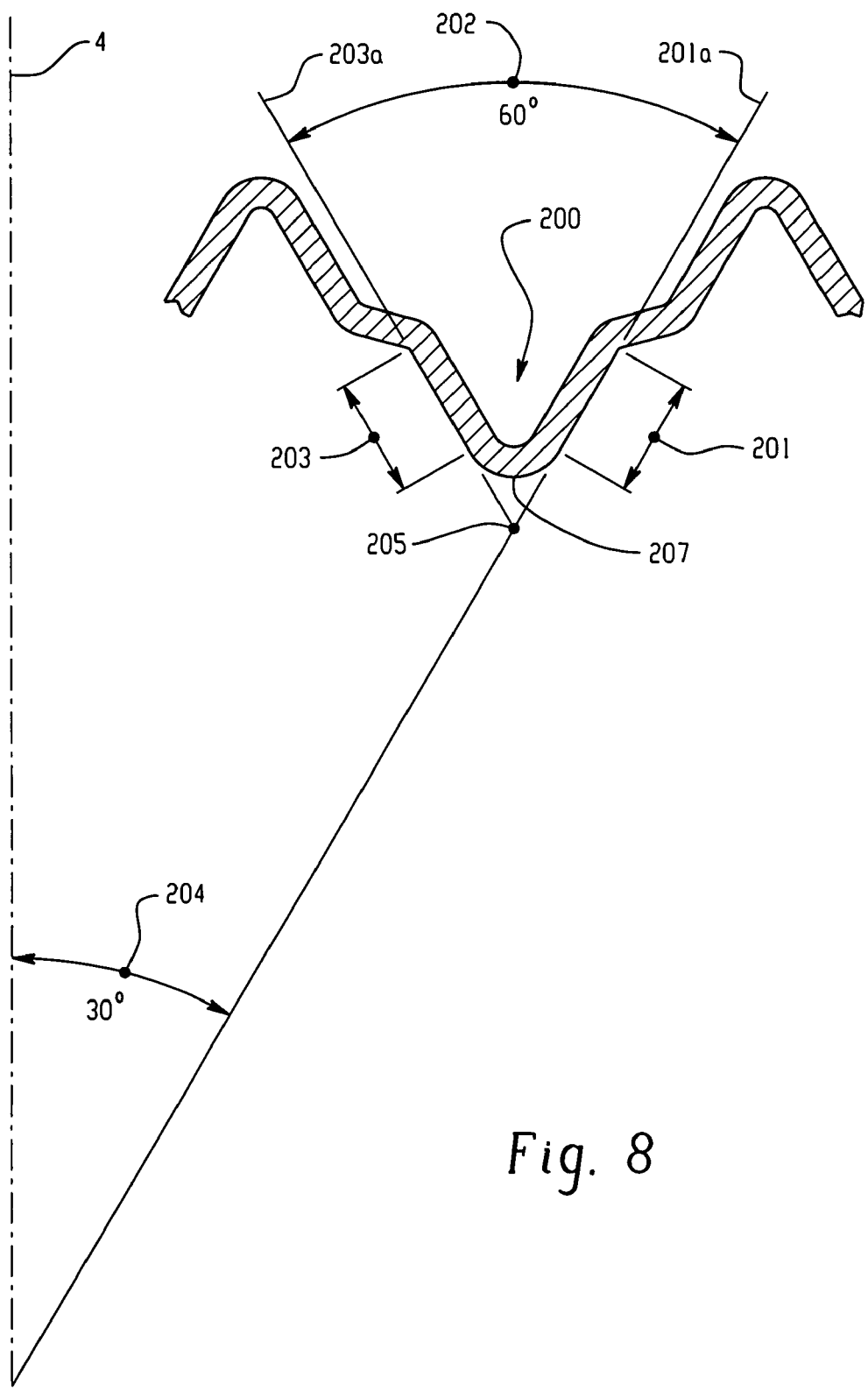
FIG. 8 is a partial cross-sectional view of an example core ring showing the angle of the corrugation.

FIG. 8 shows how the angle of a corrugation 200 can be determined. Each side of the corrugation 200 has a portion that has a straight sloped incline 201, 203. Lines 201a, 203a may be drawn parallel to these straight-sloped portions 201, 203, and extended out to a vertex 205 that is centered above the peak 207 of the corrugation 200. The angle 202 having these lines 201a, 203a and vertex 205 is the angle between the sides of the corrugation 202. In this example, the angle between the sides of the corrugation 202 is 60 degrees. An angle 204 relative to the axis 4 can also be determined by extending a the line 201a that is parallel to the straight-sloped portion 201 until it reaches the axis 4. The angle between the axis 4 and the extended line 201a will define an angle 204 of the corrugation 200 relative to the axis 4. In this example, the angle of the corrugation relative to the axis 204 is 30 degrees. If the lines 201a, 203a, do not intersect or the extended line 201a does not intersect with the axis 4 then the angle between the sides of the corrugation 202 and the angle of the corrugation relative to axis 204 is zero.

The corrugations in the example ring 1 of FIG. 1 have an angle of approximately 60 degrees between the two inclined surfaces on each corrugation. When defined relative to the axis 4, the surfaces of the corrugations are about 30 degrees from the axis 4. Other angles are also acceptable, such as angles that are about 0 to about 60 degrees between the inclined surfaces. A possible angle relative to the axis 4 ranges from about 0 degrees to about 30 degrees.

Figure 9:
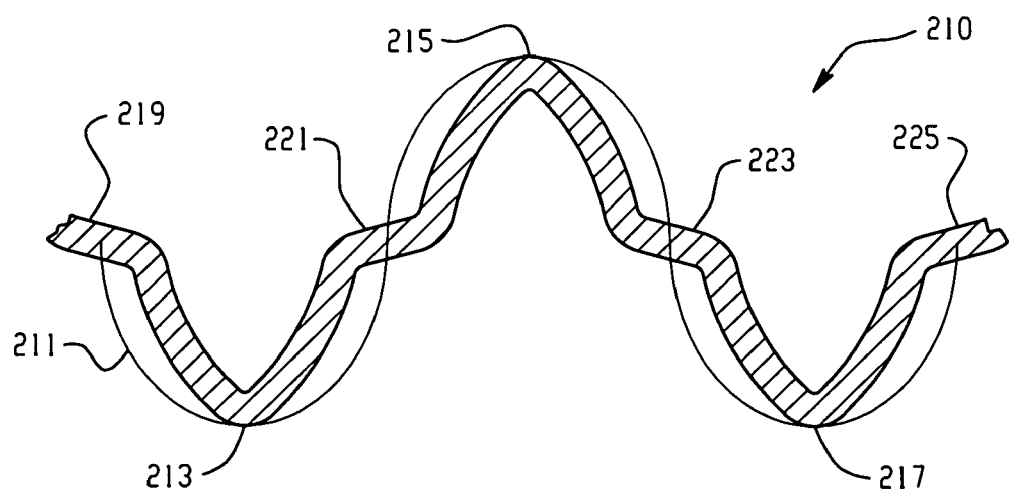
FIG. 9 is a partial cross-sectional view of an example core ring showing a superimposed sine wave.

Prior art core rings used corrugations that had a sinusoidal shape. The term "corrugation" as used in this specification is not limited to a sinusoidal shape. In fact, in each example, the corrugations should be more acute than that of a sinusoidal wave of the same period and amplitude. FIG. 9 demonstrates what is meant by being more acute than a sinusoidal wave of the same period and amplitude. A set of corrugations 210 are shown superimposed over a sine wave 211 of the same period and amplitude. Except for the peaks 213, 215, 217, each point of each corrugation is located inside the superimposed sine wave 211. The peaks 213, 215, 217 intersect with the peaks of the sine wave 211. (The linking portions 219, 221, 223, 225 also intersect with the sine wave 211 at the axis, but are not considered part of the corrugation.)

Figure 1A:
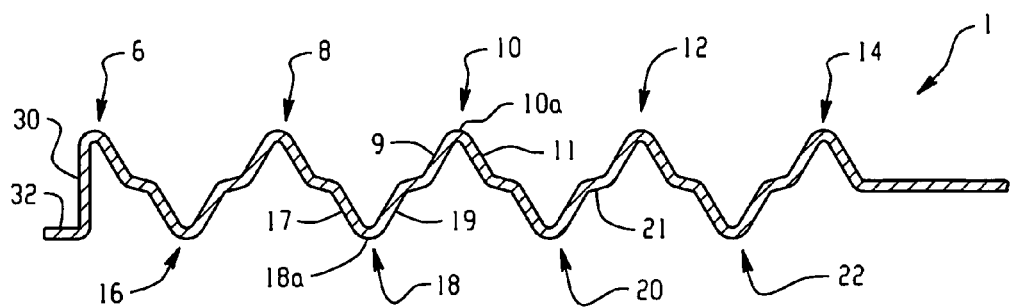
FIG. 1A is a partial cross-sectional view of the corrugated portion of the core ring of FIG. 1.

The example ring 1 depicted in FIG. 1 and FIG. 1A has a flat portion 24 that extends from the end of the outermost corrugation 6 to a folded over portion 26 at the outer diameter. This folded over portion helps prevent extrusion of the resilient material 28 shown in FIG. 2 that is attached to the core ring 1 outside of the outermost corrugation. In other examples there is no folded over portion 26.

The example ring 1 has an inner diameter grommet 30 that assists in restricting the radial extrusion of the resilient material 28 from entering the inner diameter 7. This grommet 30 has a sharply angled curve (approximately 30 degrees in this embodiment) between the two inclined surfaces of the innermost corrugation 6 wherein the innermost inclined surface is approximately parallel with the axis 4. This angle is better depicted in FIG. 4 and FIG. 6. The innermost inclined surface extends downward as far as the lowest concave corrugated peak of the core ring 1 where it joins a flat portion 32 that is approximately perpendicular to the axis 4. In other examples there is no inner diameter grommet 30.

Figure 2:
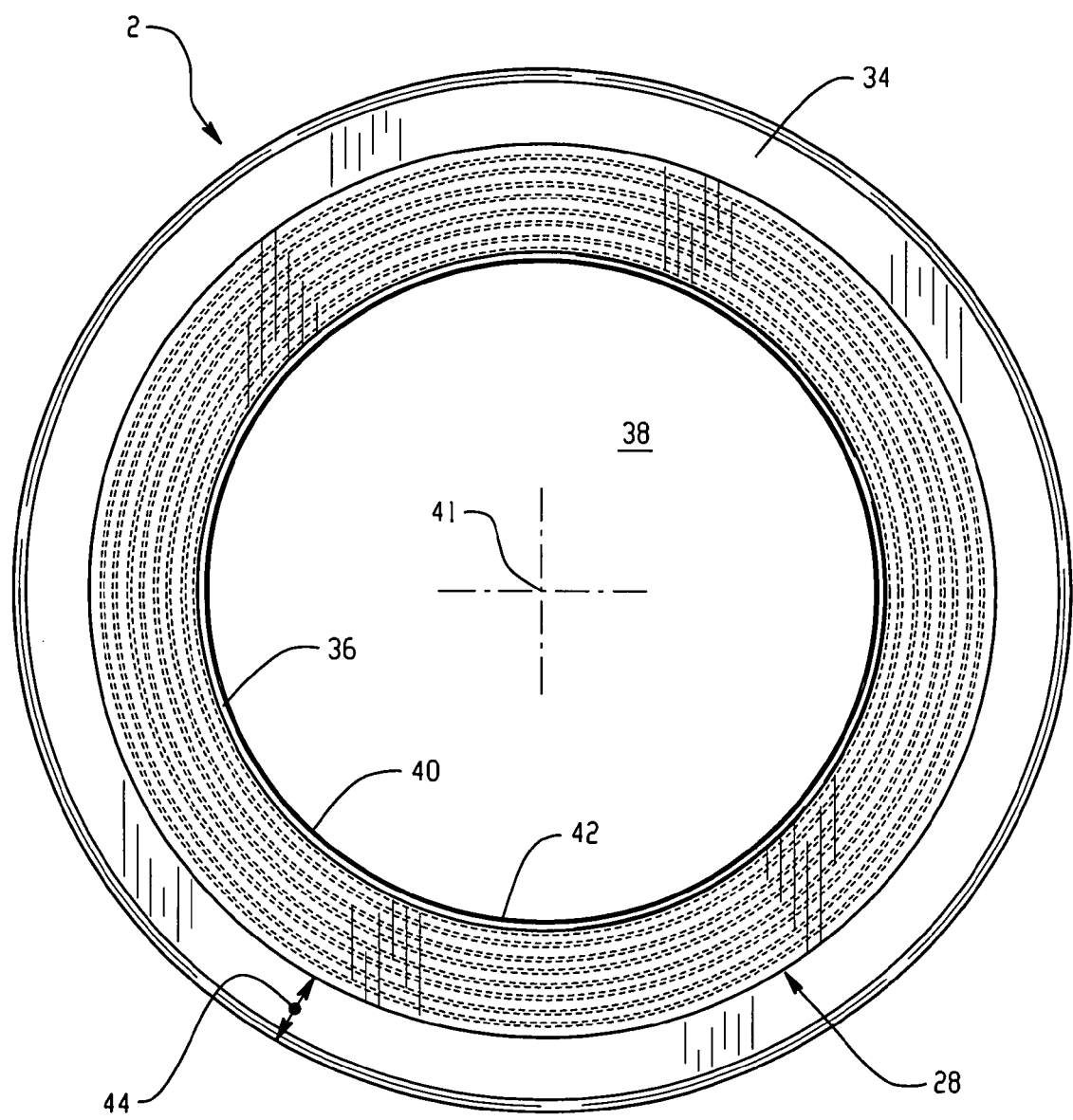
FIG. 2 is a top view of an example seal with a core ring partially covered by a graphite ring.

FIG. 2 is a view of an example seal 2 having a resilient material 28 attached to a core ring 34. The seal 2 has a center opening defined by the inner diameter 40 of the seal 2. An axis 41 runs through the center of the seal 2 and is perpendicular to the radial plane of the seal 2. In this example, the resilient material 28 covers the entire corrugated portion except for the innermost corrugation 36. A resilient material is also preferably applied to the other side of the core ring 34.

The resilient material 28 in this embodiment is compressed graphite. Particular types of graphite that could be used are Grafoil and Thermafoil, among others. Other resilient materials could also be used, including, but not limited to: Teflon, rubber, fluoropolymers, and metals. Soft materials will enhance the sealing effect of the seal by conforming to any irregularities in the faying surfaces and will provide some resiliency to absorb the compression forces and push against the faying surfaces. Hard materials may increase the durability of the seal and prevent wearing. Hard materials may also help the seal bite into the faying surface better.

When the seal 2 is in operation and placed under axial load, a resilient material may migrate into the innermost corrugation 36, but its extrusion into the inner diameter 40 will be restricted by the grommet 42.

Figure 13:
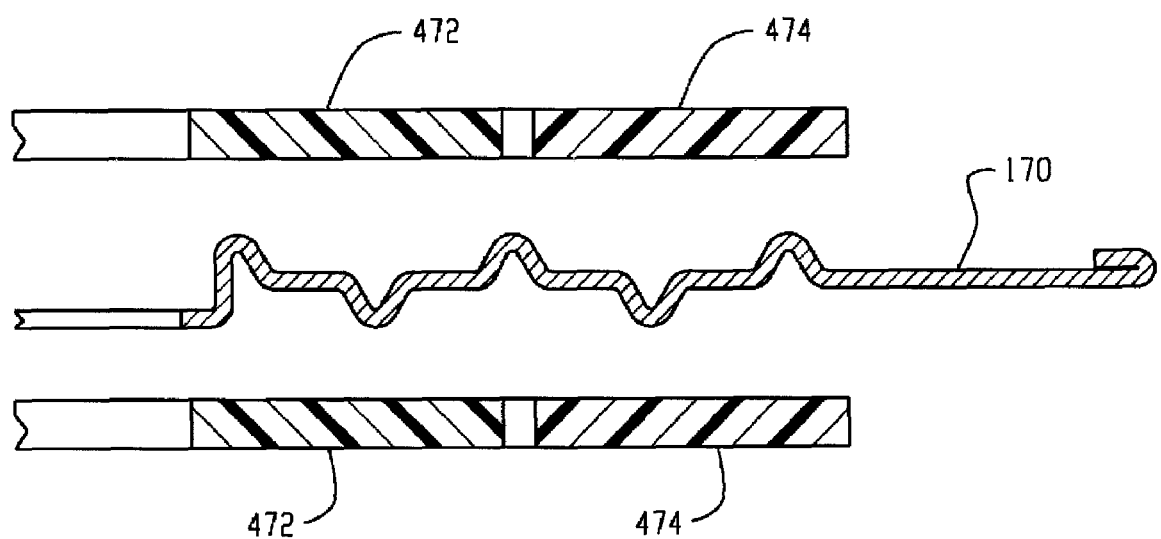
FIG. 13 is an exploded partial cross-sectional view of an example seal just before the resilient material is attached to the rigid core material.

In other examples, the resilient material 28 on both sides may also cover a portion or all of the flat outer portion 44 of the core ring 34. Additionally, the resilient material 28 may cover the entire corrugated portion or only a part of the corrugated portion. Furthermore, the resilient material 28 on the top side and bottom side can be different. For example, the top material may be graphite, while the bottom material may be Teflon. Multiple resilient materials on each side of the core ring 34 may also be used. For example, as shown in FIG. 13, the top side may have an inner ring 472 of graphite attached to the core ring 34, and on the same side have an outer ring 474 of Teflon coupled to the core ring 34.

The example core ring 34 of FIG. 2 that is partially covered by the resilient material 28 is the same core ring 34 depicted in FIG. 1, except that it shows the bottom side of the ring. In use, both the top and bottom sides of the core ring may be covered at least partially with a resilient material, or the ring can be used without a resilient material to function as a seal itself.

Figure 3:
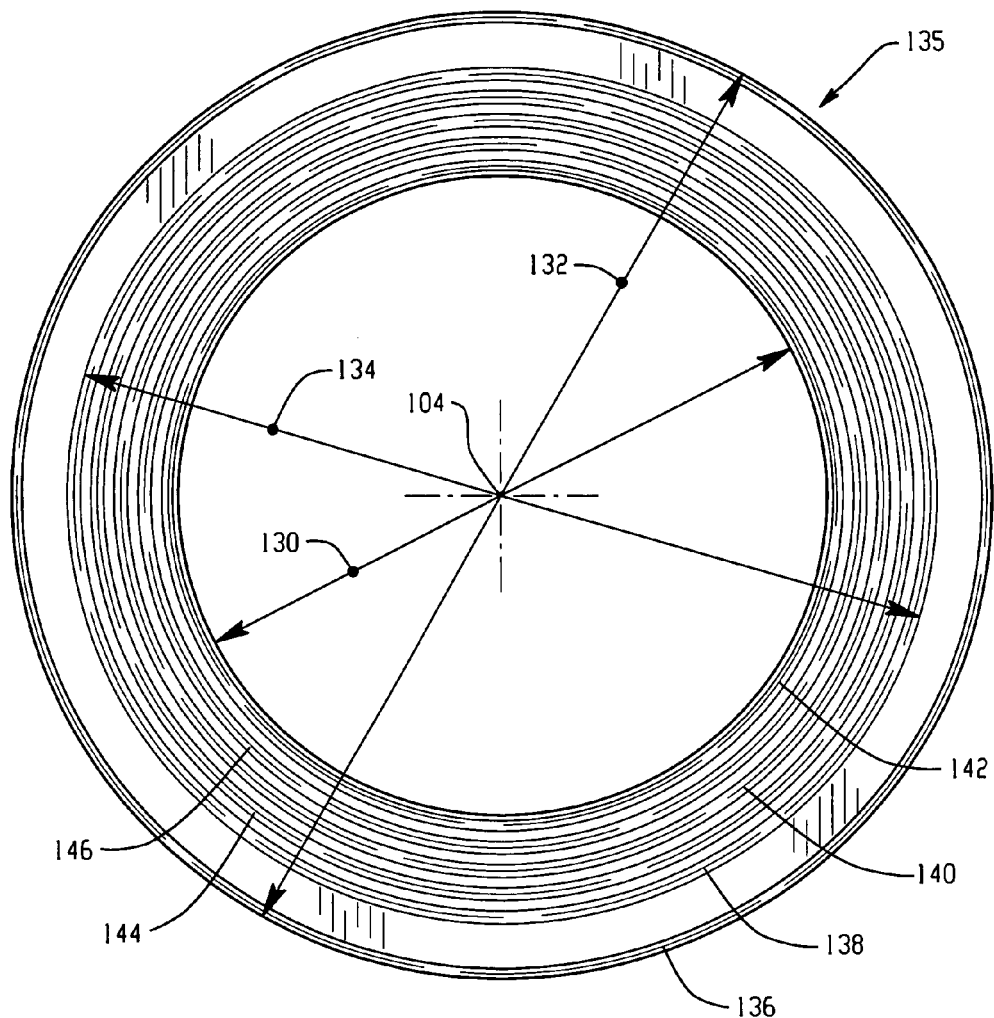
FIG. 3 is a top view of a second example core ring.

Referring to the example core ring 135 shown in FIG. 3 and FIG. 4, the core ring 135 is similar to the example core ring of FIG. 1 and FIG. 2, but this example has three convex corrugations 142, 140, 138 and two concave corrugations 144, 146. The linking portions 141, 143, 145, 147 are flat in the radial plane in this embodiment, and are better depicted in FIG. 4 than in FIG. 1 or FIG. 2.

The example core ring 135 has an inner diameter grommet 148 that is identical to the inner diameter grommets 30, 42 described above and depicted in FIG. 1 and FIG. 2. This example core ring 135 also has a folded over portion 136 on the outer diameter that is substantially identical to the folded over portion described and depicted in FIG. 1 and FIG. 2. The flat portion 150 of the grommet 148 that is approximately perpendicular to the axis is also the same as in FIG. 1 or FIG. 2, and is more clearly depicted in FIG. 4.

Some possible dimensional measurements for this example core ring 135 are as follows: 6.31 in. inner diameter 30, 8.75 in. outer diameter 32, and 8.38 in. outer edge diameter of the outermost corrugation 134. The angle between the two inclined surfaces of each corrugation in this example core ring 135 is approximately 60 degrees. This angle may range from about 0 degrees to about 80 degrees. This angle may alternatively range from about 50 to about 70 degrees. The innermost corrugation 142 typically has an angle of about 30 degrees in embodiments that feature an inner diameter grommet. The thickness of the example core ring 135 is approximately 0.015 in. The size of the fold of the folded over portion 136 is approximately 0.062 in. Various other dimensions are possible as well, for example, the seal can be made to meet the dimensions of industry standard gaskets, such as ANSI B-16.20, B-16.5, and B-16.21.

The example core ring 150 shown in FIG. 5 and FIG. 6 is similar to the other described embodiments except that it has four convex corrugations 156, 158, 160, 162 and four concave corrugations 164, 166, 168, 170. It has an inner diameter grommet 152 and an outer diameter folded over portion 154 like the above described embodiments. The linking portions are flat in this embodiment.

Figure 7:
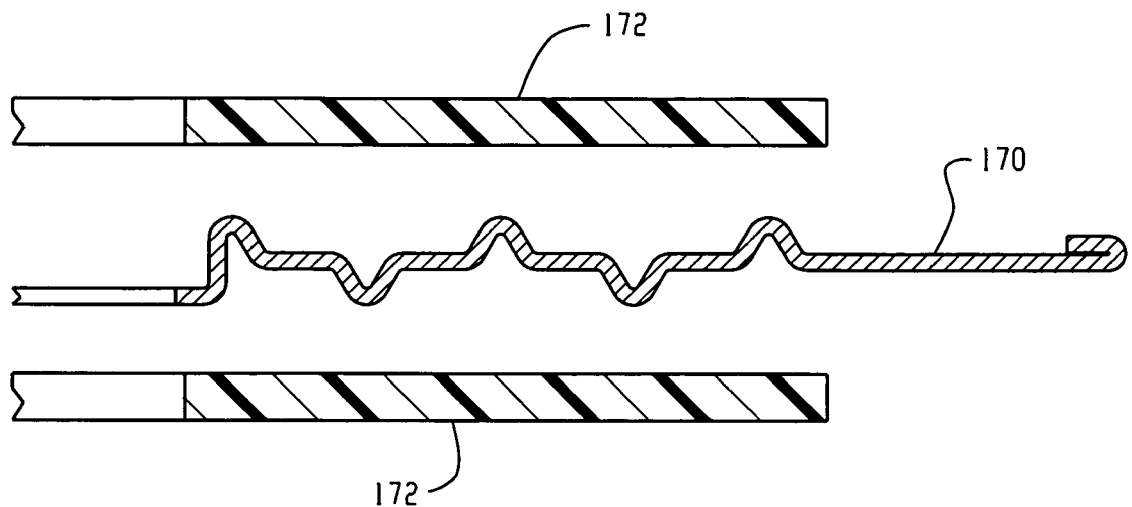
FIG. 7 is an exploded partial cross-sectional view of an example seal just before the resilient material is attached to the rigid core material.

FIG. 7 shows an example core ring 170 just before the resilient material 172 is attached to its surface. Typically, the core ring 170 is formed into the corrugated shape by stamping. In other words, the resilient material 172 is pressed into the areas between the corrugations. The core ring 170 can also be formed by machining, spinning, or molding. The resilient material 172 may also be cut to match the shape of the core ring 170.

As shown in FIG. 7 an adhesive is applied to the resilient material. Alternatively, the adhesive could be applied to the core or both the core and the resilient material. The resilient material 172 is then pressed onto the core ring 170 to attach it to both the top and bottom sides. A suitable type of adhesive utilized for this application is known by those of skill in the art.

In operation, the seal is placed into a joint to be sealed. Any joint with a faying surface may be sealed. For example, the seal may function to seal the end of pipeline connections. Bolts, screws, and various flange-type connections might also be sealed, among other connections. The seal may be particularly useful for sealing joints in the petrochemical, power generation, and refinery industries.

The seal is placed under an axial load when the two surfaces to be sealed are tightened close together. The resilient material on each side conforms to irregularities of the surfaces and provides the majority of the sealing function. The metal core functions to give the seal a solid structure that is spring-like when compressed. Additionally, the corrugations are severe enough to restrict the radial flow of the resilient material and deter extrusion. Prior art core rings use a sinusoidal wave pattern that is not angled severely enough to effectively deter extrusion. The sharper peaks also resist flattening under stress better than a sinusoidal design.

The shape of the corrugated features increases the longevity and resiliency of the seal and joint. Thus, because of the increased longevity, the seal will require less maintenance and decrease replacement costs. Furthermore, because of the increased resiliency, the seal will provide enhanced sealing function, reducing fugitive emissions. Because of the increased resiliency, less axial force will be required to create the same sealing effect that is achieved with conventional seals.

Figure 10:
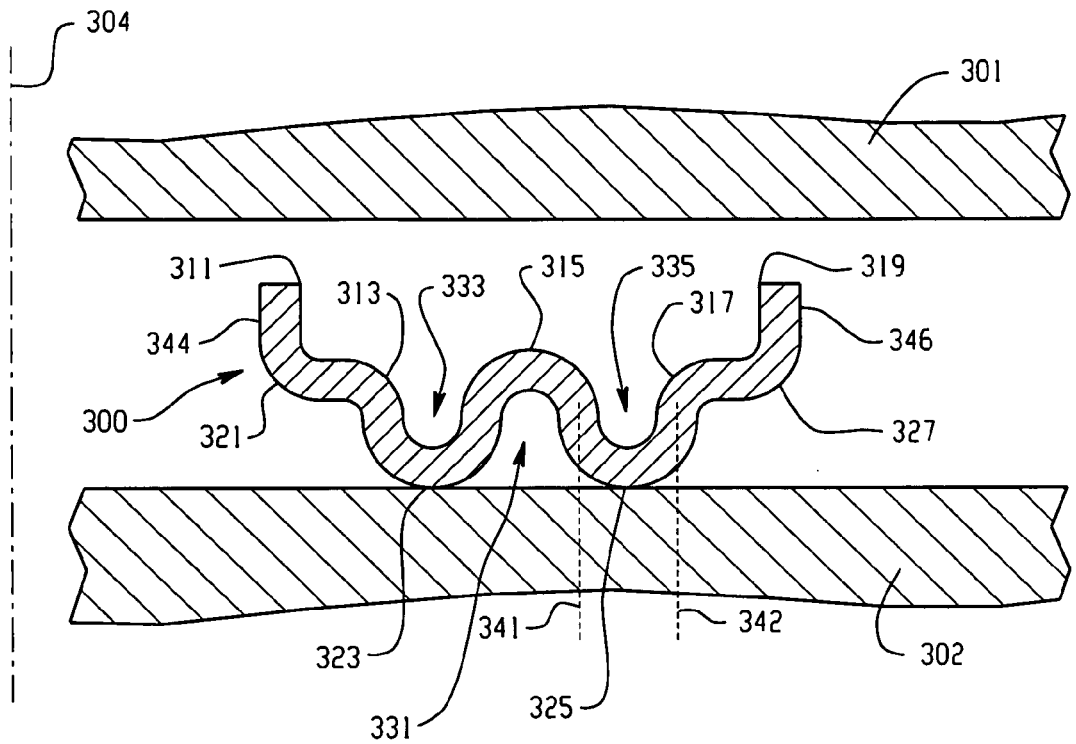
FIG. 10 is a partial cross-sectional view of an example ring seal situated between a top and bottom faying surface.
Figure 11:
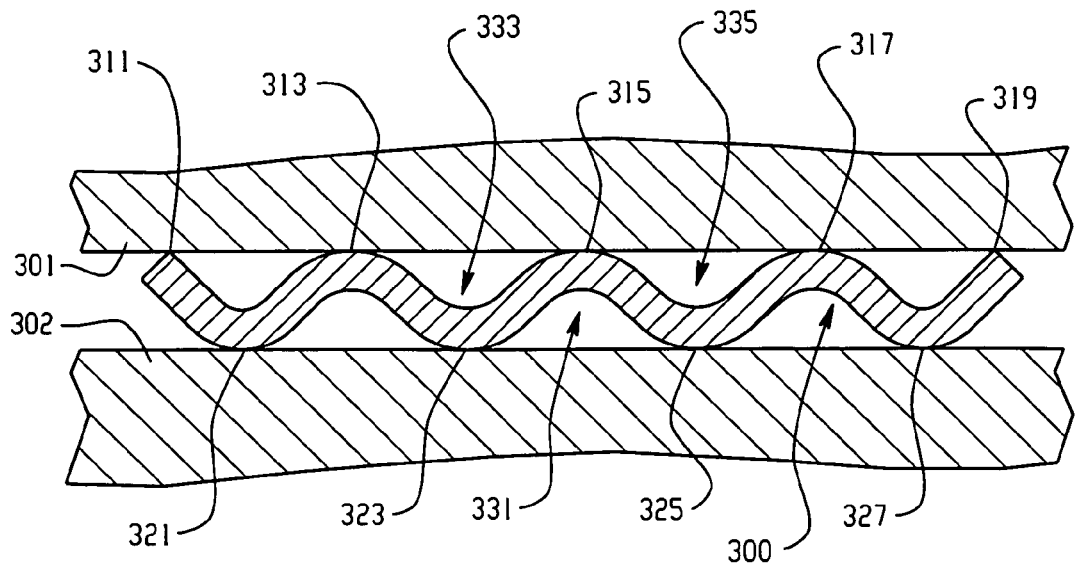
FIG. 11 is a partial cross-sectional view of the example ring seal of FIG. 10 compressed between the top and bottom faying surface.
Figure 12:
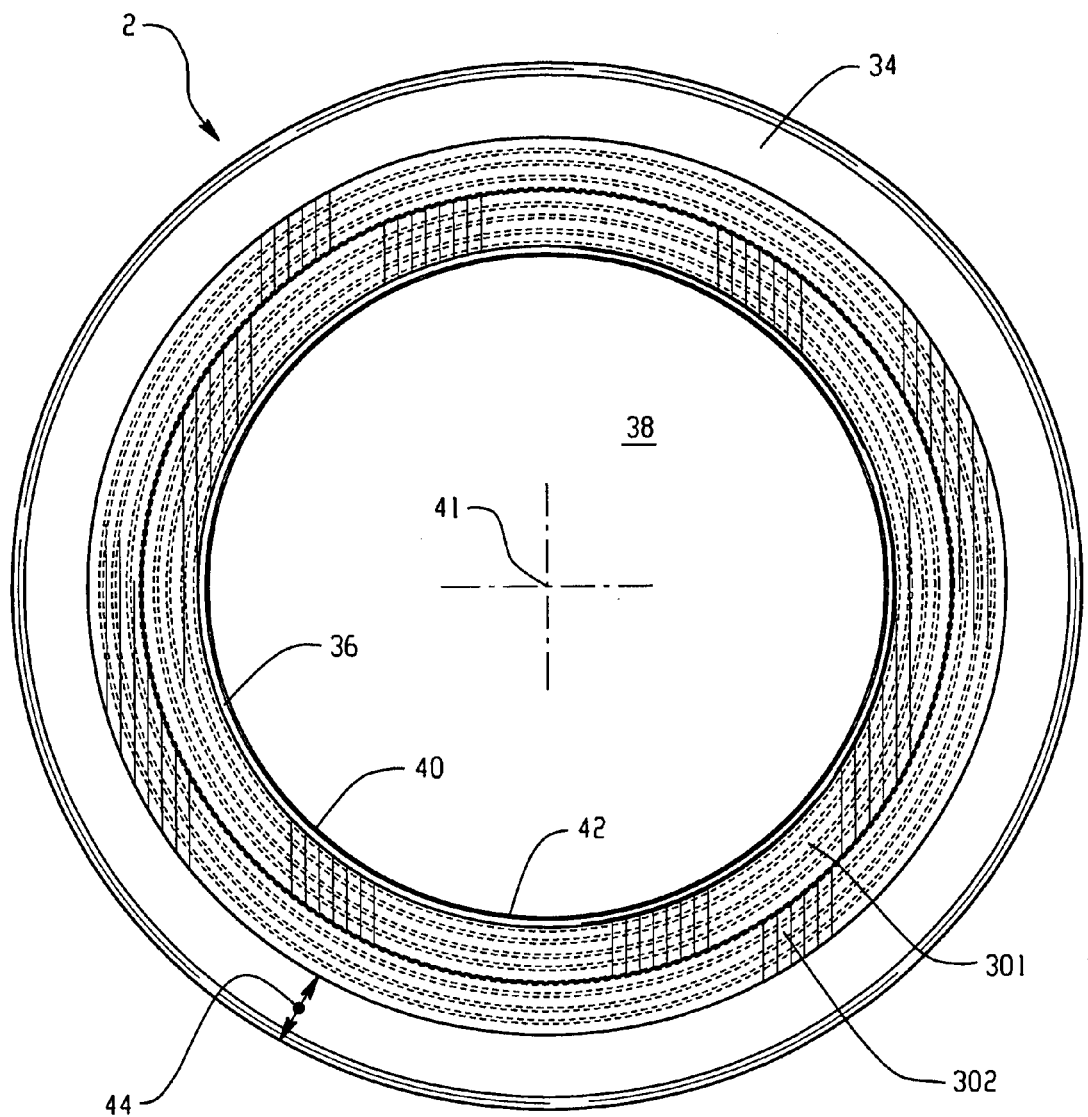
FIG. 12 is a top view of an example seal with a core ring partially covered by an inner ring of resilient material and an outer ring of resilient material.

The core ring may also be used alone as a seal. For example, the core rings shown in FIGS. 1 and 3-9 may be used without the resilient filler material. Another example of a ring only seal is depicted in FIGS. 10 and 11. This example seal 300 is particularly useful in high temperature environments that would destroy the integrity of a resilient material layer. For this reason the example ring seal 300 is preferably made of metal. For example, the seal 300 may be made of steel, stainless steel, or inconel, to name a few; however, other materials could be used for lower temperature applications.

An exhaust manifold for large trucks is one high temperature environment an example core-ring-only seal may be used in. Head-to-manifold and EGR flange-to-manifold connections, as well as connections to turbos and filter canisters are examples of specific locations the example seal may be used in.

A partial cross-section of the example ring seal 300 of FIGS. 10-11 is shown between a top faying surface 301 and a bottom faying surface 302. The seal 300 is ring-shaped and has approximately the same cross-section throughout. The seal 300 has a center opening having an axis 304 running through it. FIG. 9 shows the seal 300 resting on the bottom faying surface 302 before the top faying surface 301 is tightened onto the seal 300. FIG. 10 shows the seal 300 in a compressed state after the top faying surface 301 has been tightened onto the seal 300.

The seal 300 has five contact points 311, 313, 315, 317, 319 on the top side of the seal 300 that contact the top faying surface 301 when the seal 300 is compressed. There are four contact points 321, 323, 325, 327 on the bottom side of the seal, two of which 323, 325 contact the bottom faying surface 302 in an uncompressed state.

The seal 300 has one convex corrugation 331, and two concave corrugations 333, 335. The angles of each of these corrugations 331, 333, 335 can be determined as described above in reference to FIG. 8. In this example, the corrugations of the seal in an uncompressed state, as shown in FIG. 10, have an approximate angle of zero degrees. That is, a significant part of the sides of the corrugations are approximately parallel with the axis 304. The sides of the concave corrugation with the peak labeled 325 are shown with extended dotted lines 341, 342. When compressed, as shown in FIG. 11, the angles of corrugation will expand to some degree, but will be more acute than that of a sine wave. These seals are less susceptible than prior art corrugations are to flattening out to a point where resiliency and sealing strength is lost. This is at least partially because of the sharp angle and characteristic shape of the seal 300.

The example seal 300 has a first approximately upright portion 344 that is approximately parallel to the axis and runs around the inner diameter of the seal 300. The example seal also has a second approximately upright portion 346 that is approximately parallel to the axis and runs around the outer diameter of the seal 300. Stated another way, the first and second approximately upright portions 344, 346 are approximately parallel with the axis 304 in this example seal 300.

As shown in FIG. 11, when the seal 300 is compressed between the top and bottom faying surfaces 301, 302, it spreads out. As the seal 300 is compressed, the innermost and outermost contact points 311, 319 are contacted by the top faying surface 301. As compression continues, these contact points 311, 319 move down and away from the seal 300 until the four contact points nearest the peripheries of the seal 311, 319, 321, 327 are pushed down toward the bottom faying surface 302 and the outermost bottom surface contact points 321, 327 contact the bottom faying surface 302. When compressed, the five contact points 311, 313, 315, 317, 319 on the top side of the seal 300 and the four contact points 321, 323, 325, 327 on the bottom side of the seal 300 now contact the top and bottom faying surfaces 301, 302. The resulting shape is substantially wave-shaped, but the corrugations retain angles that are more acute than that of a sine wave.

In other examples, fewer or more corrugations may be present, and linking portions might also be used to couple the corrugations, as shown in previous figures. Furthermore, the example ring seal 300 of FIGS. 10 and 11 or one of the core rings of FIGS. 1-9 could be cladded or plated with a substance to enhance the ability of the ring to bite into faying surfaces, or to increase durability. Example substances include silver, gold, nickel, among others.

While various features of the claimed invention are presented above, it should be understood that the features may be used singly or in any combination thereof. Therefore, the claims are not to be limited to only the specific examples depicted herein.

Further, it should be understood that variations and modifications may occur to those skilled in the art. The examples described herein are exemplary. The disclosure may enable those skilled in the art to make and use examples having alternative elements that likewise correspond to the elements recited in the claims.

What is claimed is:

1. A sealing device comprising:
   a ring, having a center opening defining an inner diameter, and having a surface;
   the ring having at least one concave corrugation and at least two convex corrugations on each side of the concave corrugation associated with the surface;
   at least one of the convex and concave corrugations being more acute than a sine wave of the same period and amplitude;
   a ring of resilient material;
   wherein the concave corrugation has a linking portion on each side thereof that connects the concave corrugation to the convex corrugations on each side of the concave corrugation;
   wherein the ring of resilient material mates with the concave corrugation of the ring;
   whereby, when subjected to axial compression, the ring deters radial extrusion of the resilient material.

2. The sealing device of claim 1, wherein the concave and convex corrugations are shifted out of phase relative to one another and are coupled to one another by the linking portion.

3. The sealing device of claim 1, further comprising a grommet positioned at the inner diameter of the ring.

4. The sealing device of claim 1, further comprising a folded over portion positioned at an outside diameter of the ring.

5. The sealing device of claim 1, wherein an outermost corrugation is configured to deter the radial extrusion of the resilient material outwardly from the outermost corrugation when under axial compression.

6. The sealing device of claim 1, wherein each convex corrugation alternates with each concave corrugation on the surface of the ring.

7. The sealing device of claim 1, wherein the ring is made of metal.

8. The sealing device of claim 1, further comprising an upright portion that runs around the inner diameter and is approximately parallel to an axis that runs through the center opening.

9. The sealing device of claim 8, further comprising another upright portion that runs around the outer diameter and is approximately parallel to an axis that runs through the center opening.

10. A sealing device comprising:
    a ring, having a center opening defining an inner diameter and a surface;
    said ring disposed about a central longitudinally extending axis;
    the axis running through the center of the center opening;
    the ring having at least one concave corrugation and at least one convex corrugation disposed on the surface, and at least one of the convex and concave corrugations has a portion that has a straight slope, and the angle between the straight slope and the longitudinal axis of the ring is up to and including 30 degrees; and
    a resilient material disposed on the ring, wherein the resilient material mates with the convex corrugation or concave corrugation;
    wherein the concave corrugation or the convex corrugation has a linking portion on each side thereof, and the convex and concave corrugations are configured to deter extrusion of the resilient material and the resilient material is axially compressed when under an axial load.

11. The sealing device of claim 10, wherein each of the concave and convex corrugations are coupled together and spaced apart by the linking portion.

12. A seal comprising:
    a core ring, having a center opening defining an inner diameter, and having a surface;
    the ring having a concave corrugation and at least two convex corrugations associated with the surface;
    an angle between a first and a second side of the concave and convex corrugations is up to and including 60 degrees; and
    at least a first ring of resilient material attached to the surface of the ring;
    wherein the concave corrugation has a linking portion on each side that connects the concave corrugation to the convex corrugations on each side of the concave corrugation, and the linking portion has a lesser slope than the corrugations;
    wherein the at least one ring of resilient material mates with at least one of the convex or concave corrugations of the ring.

13. The seal of claim 12, wherein the resilient material is a graphite and the ring is a steel.

14. The seal of claim 12, further comprising at least a second ring of resilient material;
    wherein the first ring of resilient material has a smaller inner and outer diameter than the second ring of resilient material.

15. The seal of claim 14, wherein both the first and second rings of resilient material mate with at least one convex or concave corrugation on the same side of the surface of the ring.

16. The seal of claim 15, wherein each resilient material ring is composed of a different material.

17. The seal of claim 14, wherein the first ring of resilient material is coupled to one side surface of the core ring, and the second ring is coupled to the other side surface of the ring.

18. The sealing device of claim 1, wherein the linking portions are approximately perpendicular to a longitudinal axis running through the center opening of the ring.

19. The sealing device of claim 10, wherein each corrugation is separated from an adjacent corrugation by the linking portion.

20. The sealing device of claim 12, wherein the resilient material mates with the convex and concave corrugation when not under an axial load, so that inner portions of the convex and concave corrugations are completely filled with resilient material when not under the axial load, and the resilient material in the inner portions is axially compressed when under axial load, thereby limiting the radial expansion of the resilient material.

21. The sealing device of claim 10, wherein the ring is composed of steel, stainless steel, or inconel.

22. The sealing device of claim 1, wherein the linking portion has a lesser slope than the corrugations.

23. The sealing device of claim 10, wherein the linking portion has a lesser slope than the corrugations.

24. The sealing device of claim 22, wherein the linking portion is flat in the radial plane.

25. The sealing device of claim 23, wherein the linking portion is flat in the radial plane.

26. The seal of claim 12, wherein the linking portion is flat in the radial plane.

27. The sealing device of claim 1, wherein the convex or concave corrugation retains an angle that is more acute than that of a sine wave when under an axial load.

28. The sealing device of claim 10, wherein the convex or concave corrugation retains an angle that is more acute than that of a sine wave when under the axial load.

29. The sealing device of claim 12, wherein the convex or concave corrugation retains an angle that is more acute than that of a sine wave when under the axial load.

* * * * *